(No Model.) 3 Sheets—Sheet 3.
F. H. BAILEY.
TERRESTRO SIDEREAL GLOBE.
No. 336,280. Patented Feb. 16, 1886.
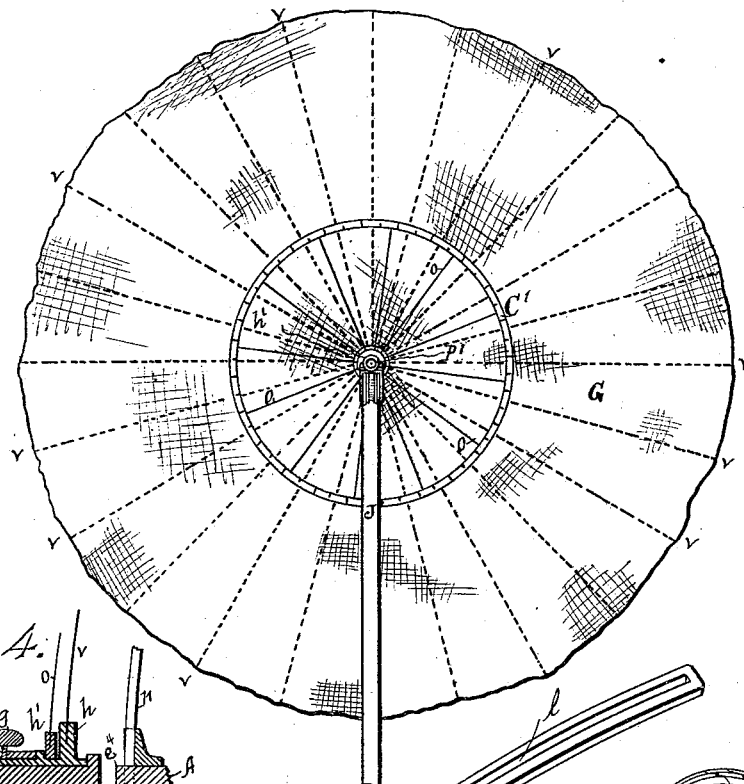
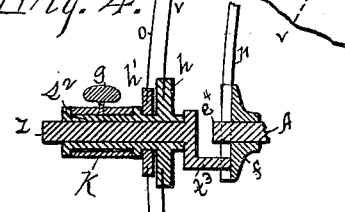
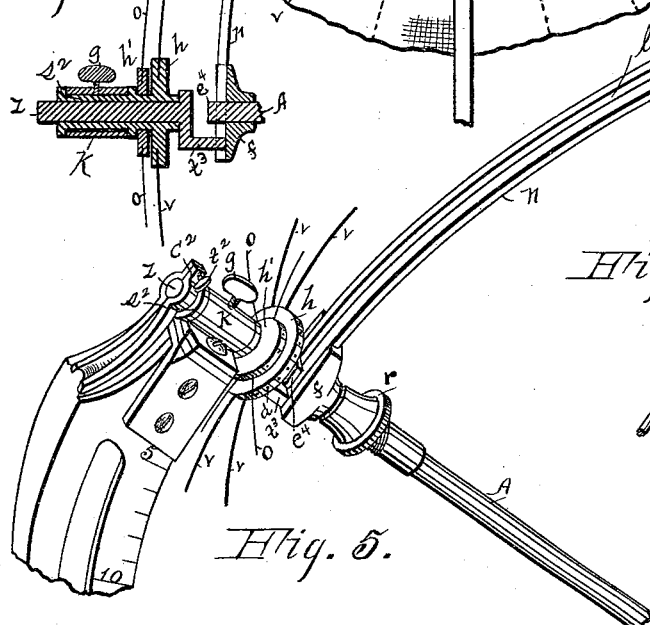
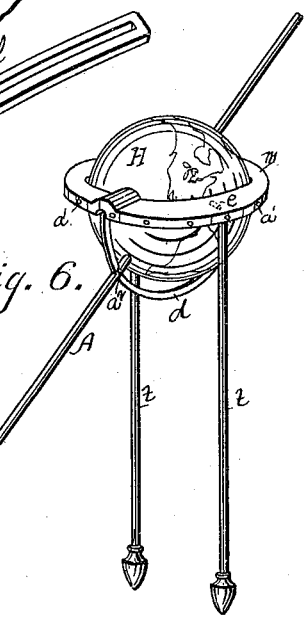
WITNESSES:
C. A. Preston
C. W. Russell
INVENTOR:
F. H. Bailey
By R. B. Wheeler
att'y

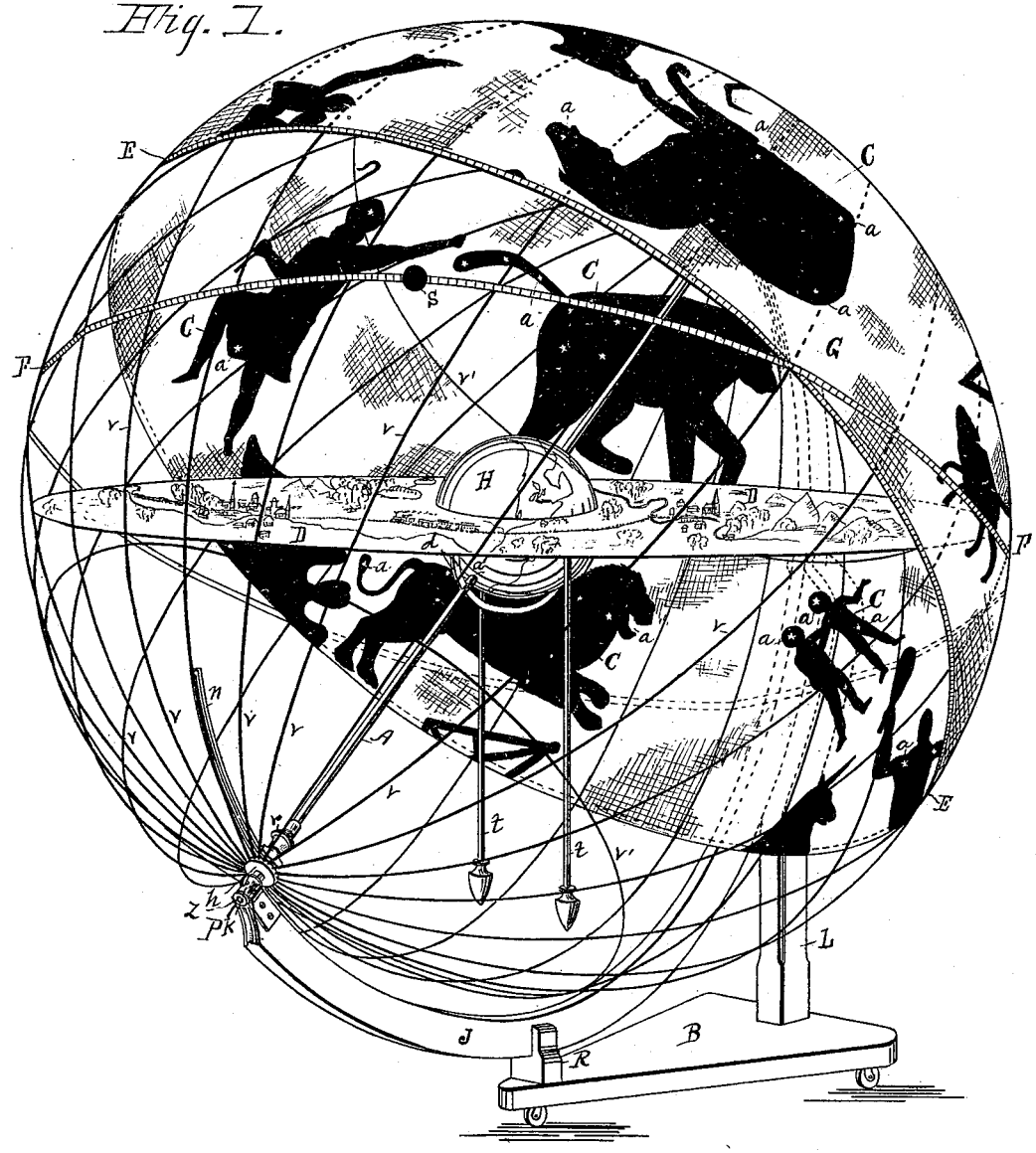

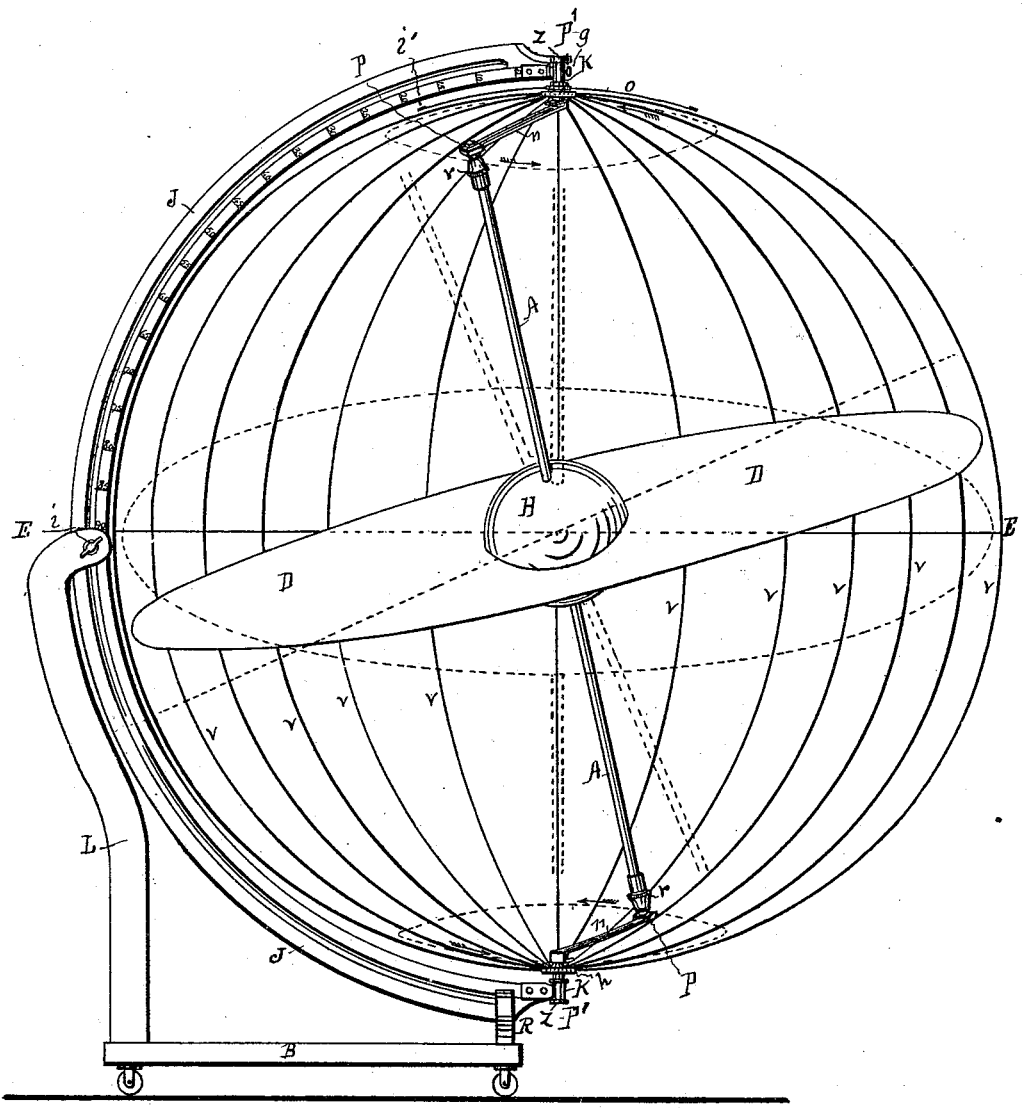

UNITED STATES PATENT OFFICE.

FRANKLIN H. BAILEY, OF HILLSDALE, ASSIGNOR OF ONE-HALF TO THE MICHIGAN SCHOOL FURNITURE COMPANY, OF NORTHVILLE, MICH.

TERRESTRO-SIDEREAL GLOBE.

SPECIFICATION forming part of Letters Patent No. 336,280, dated February 16, 1886.

Application filed October 12, 1885. Serial No. 179,662. (No model.)

*To all whom it may concern:*

Be it known that I, FRANKLIN H. BAILEY, a citizen of the United States, residing at Hillsdale, in the county of Hillsdale and State of Michigan, have invented certain new and useful Improvements in Cosmospheres; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My present invention relates to the mechanical construction of parts forming a cosmosphere.

The object of my invention is to provide a practical and perfect device or apparatus for demonstrating certain movements relating to facts and principles of astronomy, presenting to the eye of the student or observer illustrations of various celestial phenomena, showing the relation and movements of said characters; also to represent clearly the celestial characters by means of a thin or transparent covering mounted upon the outer or celestial globe, the constellations being non-transparent, and the star figures being readily seen by the cut-out portions, representing the stars as they are grouped; and my invention consists in the arrangement of and in the combination of parts, as fully set forth, and pointed out particularly in the claims.

In the drawings forming a part of this specification, Figure 1 is a perspective of my cosmosphere, having a portion of the covering of the outer celestial globe removed. Fig. 2 is a perspective of same in a shifted position, having the entire cover removed from the outer or celestial globe. Fig. 3 is a top plan of Fig. 1, showing the celestial north pole, having portions broken away, but showing a twenty-four-hour dial. Figs. 4, 5, and 6 are enlarged details, as will be fully set forth.

In the drawings, R B L represent the base-supports. I locate movably within the uprights the circular sliding arm J, which is adjustably held by the set-screw $i$. (See Fig. 2.) I attach to the free ends of the curved arm the boxes K K. In one I journal the sleeve $s^2$, having the disk $h$ formed integral therewith. Within the sleeve I journal the crank-shaft Z, having the curved arm $n$ formed integral therewith. Said arm has a longitudinal slot, $l$. Fitting loosely over the sleeve is a disk, $h'$, carrying supporting-wires $o$, upon which I mount the twenty-four-hour dial or circle C'. (See Figs. 3, 4, and 5.) The disk $h'$, I do not employ at the lower end of the arm J. The crank-axle is journaled at the lower end in a sleeve having a disk, $h$, formed integral the same as at the top of the instrument, as shown in Figs. 1 and 2. The ends of the series of wires forming the outer or celestial globe are attached to the disks $h\ h$, and revolve with said disks around the axles Z Z. The twenty-four-hour dial C' revolves with the disk $h'$ around the sleeve $s^2$. The hand $i'$ indicates the hour upon the dial. Joining the crank-shaft is a central shaft, A, its ends fitting into the slots $l\ l$ of the curved arm $n\ n$, its heads $e^4$ fitting over the outer plane of said arms, as shown in Fig. 5. At each end of the shaft A is a sliding jaw, $f$, which receives the body of said arms, and is held against said arms by means of the thumb-nuts $r\ r$, and when the parts are attached, as shown in Figs. 1 and 5, the shaft A is in axial line with the journal-bearings Z Z. Mounted on the center of the shaft A is a small terrestrial globe, H. Bisecting said globe is a horizon-disk, D, representing to the observer, when adjusted as shown in Fig. 1, the apparent earth's surface, and is made sufficiently large to meet the inner walls of the celestial globe. The disk D is mounted upon a series of diverging wires anchored at one end to the ring $m$ at $a'$, bisecting the terrestrial globe H, said ring being pivoted on opposite points on the pins $e$, projecting from the globe. Passing at right angles from the ring and from the under side, and over the under surface of the globe, is a guard-circle, $d$. Said circle also passes through the shaft A, and is held by a set-screw, $a^2$, when adjusted as in Fig. 2, to illustrate precession of equinoxes, plane D being then held firmly at right angles with the axis A, as clearly shown in Fig. 6.

I show in Figs. 1 and 6 two plumb-rods, $t\ t$. Said rods are attached to the under face of the ring $m$, directly below the pivoted points $e$. Said rods are attached at right angles to the plane of the ring, and are intended to hold the disk D in a horizontal position when outer or celestial globe revolves or is tipped to any angle from perpendicular to horizontal within the supports L R. The rods $t\ t$ are made detachable, and may be removed from the ring $m$, as shown in Fig. 2.

In the drawings, P P represent the poles of the equator. It will be observed that the arms $n\ n$ of the crank-axles Z Z are set in opposite directions, and by loosening the thumb-nuts $r\ r$ and forcing the ends of the shaft A in opposite directions within the channels $l\ l$ of said arms to the position of Fig. 2 and tightening the nuts $r\ r$ the poles of the equator will be moved twenty-three and a half degrees, when previous poles of outer globe become the poles of the ecliptic, as shown at P′ P′ of Fig. 2, and previous equator E of outer globe becomes the ecliptic, and the edge of disk D represents celestial equator when so set for illustrating precession of equinoxes. The celestial globe is covered with another transparent cover having constellations, stars, &c., so arranged that its poles are at the poles of the ecliptic instead of the poles of the equator, as in cover to Fig. 1.

In Figs. 1 and 3, G represents a wire or transparent cloth covering, and is made in sections and placed over the series of wires V, forming the celestial globe. C represents the constellations, which I form of black or non-transparent material, the star figures being clearly indicated by cutting or punching the conventional star-shaped openings in them, as indicated by the letters $a$ of Fig. 1. In Fig. 1 I show said covering over the northern hemisphere of the celestial globe, and in which E represents the celestial equator. S represents the sun, which may be attached and detached, as desired, along the belt, F F representing the ecliptic, in which the cross-lines represent points of the sun for each day of the year, and are dated. The moon and its movements are indicated in a like manner in its proper path. The covering for the southern hemisphere of the celestial globe is attached in the same manner as the covering of the northern hemisphere, and both may be removed, as shown in Fig. 2.

The peculiar movement given to the terrestrial globe and disk D is clearly shown by dotted lines and arrows of Fig. 2, when the shaft A, supporting the terrestrial globe, is attached to the outer ends of the revolving arms $n\ n$, as herein set forth. To revolve the arms $n\ n$ within the celestial globe and have said globe stand still, the thumb-screw $g$ is tightened against the sleeve $s^2$, as shown in Fig. 4. To fix the terrestrial globe and disk D stationary, the thumb-screw $t^2$ is tightened, when the clamping-jaws $C^2$ will hold the crank-shaft stationary. To cause the celestial globe to revolve around the terrestrial globe, the thumb-screw $g$ is loosened, when the celestial globe may be readily revolved.

It will be observed from the foregoing that the disk D represents the apparent flat earth, bisecting also the celestial globe, and that it maintains its horizontal position, while the celestial globe revolves about it from east to west to illustrate the apparent daily motion of the celestial bodies, and from north to south through a quadrant to adjust it to different latitudes. A toy house, with slot on northern side and half-way across the top for axis to play in when setting for different latitudes, is placed on the landscape-disk D, covering the terrestrial globe H, to represent the schoolhouse when globe is set as in Fig. 1, (which is not shown.)

Having thus set forth my present invention, what I claim as new, and desire to secure by Letters Patent, is—

1. The combination, with a skeleton globe, of a transparent covering supporting non-transparent characters representing the constellations, substantially as set forth.

2. The combination, with a skeleton globe, of a transparent covering supporting non-transparent characters representing the constellations of the star figures being formed by perforations through the non-transparent characters, as and for the purposes specified.

3. The combination, with a skeleton globe, of a sectional detachable transparent covering supporting non-transparent characters having the stars cut therein, as and for the purposes set forth.

4. The combination of the crank-axles journaled in suitable bearings carrying the arms $n\ n$, the shaft adjustably attached to said arms, said shaft carrying a terrestrial globe, and disk D, bisecting the celestial globe, said parts located within the celestial or skeleton globe, substantially as specified.

5. The combination of the crank-axles journaled in suitable bearings carrying the curved slotted arms, the shaft adjustably attached to said arms, said shaft carrying a terrestrial globe, said parts located and adapted to be revolved within the celestial or skeleton globe, as and for the purposes herein described.

6. The combination of the shaft A, carrying the terrestrial globe, the ring $m$, encircling and pivoted to said globe, the plumb-rods attached to said ring, the wires supporting the disk, the disk mounted thereon, the circular bar attached to the ring $m$, passing through the shaft, and the set-screw, as and for the purposes specified.

7. In combination with the base-supports, the curved arm J, the boxes mounted on its free ends, the sleeves journaled in said boxes, carrying the disks $h\ h$, the series of wires V, forming the celestial globe, attached to said disks, the transparent covering mounted on said globe, the disk $h'$, journaled on the sleeve, carrying the wires $o$, the twenty-four-hour dial mounted on said wires, and located around the northern axis and over the celestial globe, the belt F, representing the ecliptic, mounted on said cover, and the sun mounted on said belt, substantially as and for the purposes set forth.

In testimony whereof I affix my signature in presence of two witnesses.

FRANKLIN H. BAILEY.

Witnesses:
R. B. WHEELER,
I. H. DOYLE.